March 28, 1939.　　　S. KOHN　　　2,152,314
FRANKFURTER COOKER
Filed Dec. 7, 1936　　　2 Sheets-Sheet 1

INVENTOR
SAMUEL KOHN
BY
ATTORNEY

March 28, 1939. S. KOHN 2,152,314
FRANKFURTER COOKER
Filed Dec. 7, 1936 2 Sheets-Sheet 2
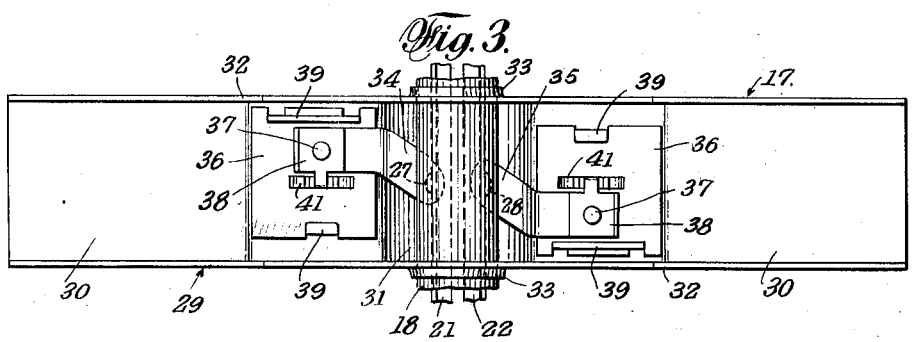
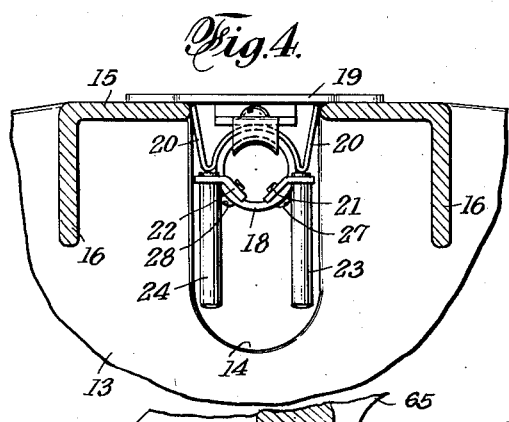
INVENTOR
SAMUEL KOHN
ATTORNEY Patented Mar. 28, 1939

2,152,314

UNITED STATES PATENT OFFICE 2,152,314

FRANKFURTER COOKER

Samuel Kohn, Jackson Heights, N. Y.

Application December 7, 1936, Serial No. 114,581

13 Claims. (Cl. 219—19)

The present invention relates to grills or cookers for frankfurters and the like, wherein the electric current is passed through the frankfurter, which, acting as a resistance to the flow of current, generates sufficient heat whereby it is cooked.

The invention has for its primary objects, the provision of a grill or cooker for the purpose, which is of simple construction; may be easily, safely and economically operated; and is adapted to be thoroughly and expeditiously cleaned.

While the extreme simplicity of the present construction renders the device as here disclosed, generally desirable, the invention also resides in certain novel features such as improved means for putting a frankfurter into and out of the cooking circuit; means for timing the cooking period; automatic means for opening the cooking circuit; and other features later apparent.

The features of the invention, as contemplated, are disclosed in the following detailed specification which is descriptive of the accompanying drawings in which is exemplified a preferred form of the invention.

In the drawings:

Fig. 3 is a bottom plan view to an enlarged scale, of one of the cooking units.

Fig. 4 is an enlarged sectional view as taken on the line 4—4 of Figure 2.

Figs. 5 and 6 are still further enlarged sectional views through one of the electrodes as taken on the line 5—5 of Figure 1, showing the tines of said electrode, respectively, spread and closed for insertion into a frankfurter.

Fig. 7 is an end view, partly in section, of the device incorporating means for timing a frankfurter and for moving same out of the cooking circuit.

Fig. 8 is an enlarged fragmentary detail of the timing cam.

Figure 1:
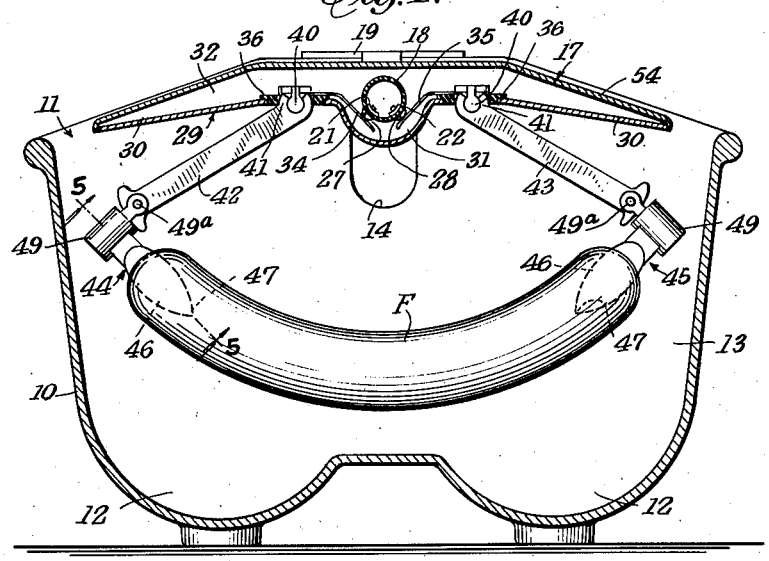
Fig. 1 is a cross-sectional view of a grill incorporating the invention.

Referring in greater detail to the drawings, the grill is shown as being provided with a bowl 10, open at its top as at 11, and formed with one or more trough-like grease receiving portions 12. The bowl is preferably formed as an elongated member having substantially straight end walls 13, each provided with an opening 14 centrally placed at the top thereof. An outwardly extending lip or ledge 15 is formed at the top of each wall 13, and each ledge is provided with a skirt portion such as shown at 16.

The above described bowl while adapted to be cast of metal or moulded of Bakelite or other such phenol compound is preferably formed of sheet metal provided with a coating of vitreous enamel and therefore rendering it long-lifed and easy to clean.

The cooking member comprises a gang of tiltable units 17 strung upon a tube 18 of dielectric material. Each end of the tube is provided with a hanger bracket portion 19, each adapted to rest upon one of the ledges 15 of the bowl whereby the tube 18 is supported across the open top of said bowl. In addition, each end of the tube 18 is provided with resilient portions 20 adapted to engage against the walls of the openings 14 to effectively position said tube centrally in the bowl without the necessity of providing a close fit for the cooking member in the bowl. In this manner, this member is adapted for ready application to the bowl and removal therefrom.

Lengthwise of the tube 18 and spaced from each other, there is disposed a pair of metal buss bars 21 and 22, terminating respectively in a contact prong 23 and 24. Said prongs are directed downwardly at one end of the tube 18 so as to be covered by one of the ledges 15 and its skirt 16 and adapted to be engaged by a plug 25 at the end of an electric cable 26 connected to a common source of current.

The buss bars 21 and 22 are each secured to the tube 18 as by the respective screws or other fastening means 27 and 28 which also form the contactors for supplying electric current to the units 17 from the buss bars.

Figure 2:
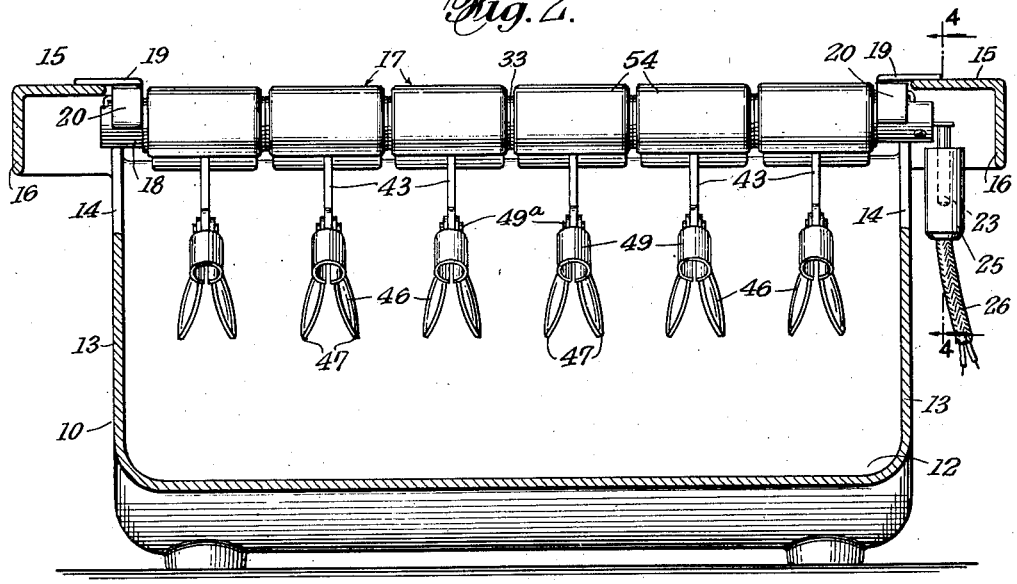
Fig. 2 is a vertical longitudinal sectional view thereof.

Each unit 17 is arranged transverse of the bowl 10 and is constructed substantially as follows:

A shallow, preferably stamped member 29 is formed with oppositely disposed similar wing portions 30 and a central enlarged portion 31. The walls 32 of the member 29 are provided with an opening for mounting said member on the tube 18, said openings being each formed with an embossment 33. As will be noted from Figure 2 the units are in abutting relation, the embossments 33 of adjacent units touching. The outer embossments of the two outer units are positioned against the respective brackets 19 and in this manner the entire gang of units is definitely positioned on the tube 18 and each is adapted to swing or tilt therearound.

Each pair of the contact screws 27 and 28 is arranged to be impinged by the respective contact springs 34 and 35, having their ends positioned in the enlarged portion 31, and each secured to a dielectric plate 36 by means such as the screw 37 and nut 38.

The said plates 36 are each set over an opening in the wings 30 of the member 29 and held in position as by means of the struck-up portions 39 of said member.

Each nut 38 is preferably formed with a substantially circular lug 40 bent to pass through an opening in the plate 36. These lugs are each engaged by the encompassing bearing portions 41 and the neck of the lugs 40.

The arm 42, at its free end, is provided with a device 44 for piercing the end of a frankfurter, the arm 43 being provided with a similar device 45. The construction of these devices which are best seen in Figs. 1 and 5 is as follows:

A pair of tines 46 formed with frankfurter piercing prongs 47 and curved abutting portions 48, is mounted by means of the mentioned curved portions, in a sleeve 49, pivotally carried at 49a on the free end of each arm 42, 43. The said curved portions are cut away as at 50 so a bowed spring member 51 may be positioned in the sleeve 49 with its free ends 52 in engagement with the adjacent faces of the tines 46. In this manner, the tines are resiliently held in spaced relation with their curved ends in abutment. Preparatory to insertion into a frankfurter, the tines are grasped and pressed together as seen in Figure 6, so the prongs 47 practically form a single piercing member. When the tines are released after insertion into a frankfurter, the spring 51 tends to spread the prongs and hence insures positive electrical contact between them and the meat of the frankfurter.

As will be noted, the articulation afforded by the lug and bearing 40 and 41, and the pivot 49a adapts each pair of arms to successively receive between them a considerably varying size range of frankfurters. To afford further universal movement of the tines, the sleeves 49 are slitted as at 53 so the tines, as a pair, may move in a plane across the path of movement of the arms 42 and 43.

It will be apparent from the drawings and the above description, that each unit 17 is so designed and constructed, as to be interchangeable with any other unit of the device and in addition is adapted to be mounted on the tube 18 with either the arm 42 or 43 to the right.

A cover 54 is provided for each unit 17 and is adapted to be readily applied and removed so easy access may be had to the contacts 34 and 35 for repair or replacement when necessary.

When a frankfurter is placed in one of the units, the electric current flows as follows: Terminal prong 23, buss bar 21, contact screw 27, spring contact 34, arm 42, piercing device 44, frankfurter F, piercing device 45, arm 43, spring contact 35, contact screw 28, buss bar 22, and terminal prong 24, or vice versa. In a similar manner the current is adapted to flow through a frankfurter placed in any of the other units.

When the frankfurter is cooked, that unit 17 in which a frankfurter has been placed, is simply swung 180° so the arms 42 and 43 face upward. The spring contacts will then lose contact with the screws 27 and 28, coming to rest on the outer wall of the tube 18 and thereby breaking the electric circuit; the frankfurter may now safely be removed and another inserted. When this is done the unit is again swung 180° to re-establish the electric circuit so cooking may occur.

Means may also be provided for timing the cooking period. One manner of accomplishing this is illustrated in Fig. 6 and comprises an electric motor or clock-works 60 which drives a shaft 61 at a constant rate of speed. Upon this shaft is mounted a cam 62 for each unit of the cooker. Each cam is provided with at least one lug 63 adapted to engage the end 64 of an arm 65 pivoted at 66. The other end of the arm 65 is preferably provided with a segmental rack 67 in mesh with a gear 68 mounted on the unit 17. As can be seen from this structure, when the lug 63 raises the end 64 of the arm 65, the rack 67 will rotate the gear 68 and therefore the unit 17, which will assume the position shown. The shaft will continue to rotate, but the unit will remain in this inverted position, the lug 63 merely passing beneath the lever end 64.

Each cam 62 may be set in relation to the lever end for a predetermined cooking period. This may be accomplished through the medium of the one-way clutch 69 which permits movement of the cam in relation to the shaft 61. The cooking period may be varied by setting the lug 63 of the cam so its marker 70 is aligned with a selected marker or notch 71 on a flange or collar 72 fixed to the shaft 61 and between two of which the cam 62 is positioned. In this manner the full cooking period is utilized when the cam is set as in Figure 8 and a shorter period may be had by positioning the lug in alignment with one of the other notches 71.

As can be seen from the foregoing a simple, efficient and quite economical grill for frankfurters has been disclosed in its preferred embodiment. It is also apparent that skilled persons may make many immaterial changes in the design thereof without departing from the true spirit and scope of the invention. The prior art, therefore, should be the only means for determining the scope of the following claims.

What I claim as new and desire to secure by Letters Patent, is:

1. A frankfurter grill comprising a bowl, a member mounted transversely across the top thereof, and a plurality of independently tiltable units mounted on said member, adapted to swing from operative to inoperative positions, each unit being adapted to receive and support a frankfurter.

2. A frankfurter grill comprising a bowl, a member mounted transversely across the top thereof, a plurality of units tiltably mounted on said member, to swing between operative and inoperative positions, means for conducting electric current to each unit, and means on each unit for receiving and supporting a frankfurter in electric circuit with said current conducting means.

3. A frankfurter grill comprising a bowl, a removable member mounted transversely across the top thereof, a plurality of units rotatably mounted on said member, to swing between an operative and an inoperative position, each of said units being provided with articulated means for supporting a frankfurter, and means for conducting electric current to the frankfurter.

4. A frankfurter grill comprising a bowl, a removable member mounted transversely across the top thereof, a plurality of units mounted on said member, to rotate between an operative and inoperative position, each of said units being provided with articulated means for supporting a frankfurter, and means for conducting electric current to the frankfurter, said last mentioned means including a pair of metallic members longitudinally disposed within the transverse member, and means connected with the articulated means and in contact with the metallic members.

5. A frankfurter grill comprising a bowl, a member mounted transversely across the top thereof, a plurality of tiltable units mounted on said member, to rotate between an operative and an inoperative position, means for conducting electric current to each unit, means for supporting a frankfurter in electric circuit with said current conducting means, and means whereby said electric circuit is broken when said tiltable units are rotated to the inoperative position.

6. A frankfurter grill comprising a bowl, a member mounted transversely across the top thereof, a plurality of tiltable units mounted on said member, to rotate between an operative and an inoperative position, means for conducting electric current to each unit, means on each unit for supporting a frankfurter in electric circuit with said current conducting means, and means for tilting each unit to inoperative position whereby the electric circuit to said unit is broken.

7. A frankfurter grill comprising a bowl, a member mounted transversely across the top thereof, a plurality of tiltable units mounted on said member, means for conducting electric current to each unit, means on each unit for supporting a frankfurter in electric circuit with said current conducting means, and means for tilting each unit whereby the electric circuit to said unit is broken, said last mentioned means comprising a uniformly rotating shaft, cam means on the shaft, and members operated by the cam means and connected to said unit.

8. In a frankfurter grill, a bowl, a unit, tiltable relative to said bowl, a pair of downwardly directed arms pivotally mounted in said unit, a frankfurter piercing device on the end of each arm, and means for conducting electricity to the piercing devices.

9. In a frankfurter grill, a bowl, a unit, tiltable relative to said bowl, a pair of downwardly directed arms pivotally mounted in said unit, a frankfurter piercing device on the end of each arm, means for conducting electricity to the piercing devices, and means whereby upon rotation of said unit the electricity conducting means is rendered inoperative.

10. In a frankfurter grill, a bowl, a unit, tiltable relative to said bowl, a pair of arms pivotally mounted on said unit, means for conducting electric current to the arms when said arms are downwardly directed, means for interrupting said current when said arms are directed upwardly, and frankfurter engaging means at the free end of each of said arms.

11. A frankfurter grill comprising a bowl, a member mounted transversely across the top thereof, a plurality of tiltable units mounted on said member, each of said units being provided with articulated means for supporting a frankfurter, and means for conducting electric current to the frankfurter, said last mentioned means including a pair of metallic members longitudinally disposed within the transverse member and an element connected with each of the articulated means and in contact with the metallic members.

12. A frankfurter grill comprising a bowl, a member mounted transversely across the top thereof, a plurality of tiltable units mounted on said member, means for conducting electric current to each unit, means on each unit for supporting a frankfurter in electric circuit with said current conducting means, and means for tilting each unit whereby the electric circuit to said unit is broken, said last mentioned means comprising a gear on each unit, a pivoted segment meshing said gear, a cam engaging portion on said segment, a uniformly rotating shaft, and a cam on said shaft adapted to engage the mentioned cam engaging portion.

13. A frankfurter grill comprising a bowl, a member mounted transversely across the top thereof, a plurality of tiltable units mounted on said member, means for conducting electric current to each unit, means on each unit for supporting a frankfurter in electric circuit with said current conducting means, and means for tilting each unit whereby the electric circuit to said unit is broken, said last mentioned means comprising a gear on each unit, a pivoted segment meshing said gear, a cam engaging portion on said segment, a uniformly rotating shaft, and a cam on said shaft adapted to engage the mentioned cam engaging portion, said cam being adapted for pre-settable positioning on said shaft whereby the movement of each unit is varied.

SAMUEL KOHN.